June 19, 1962 B. J. ALECK 3,039,649
FASTENER ASSEMBLY
Filed July 29, 1959 2 Sheets-Sheet 1
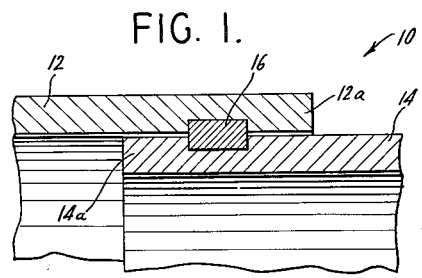
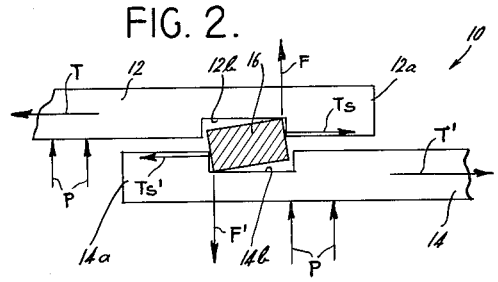
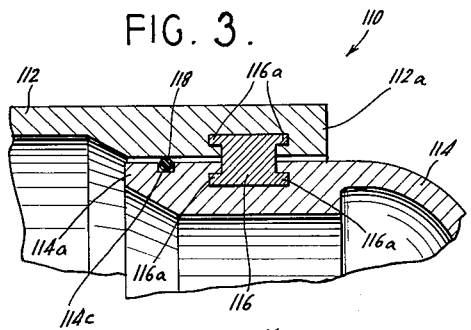
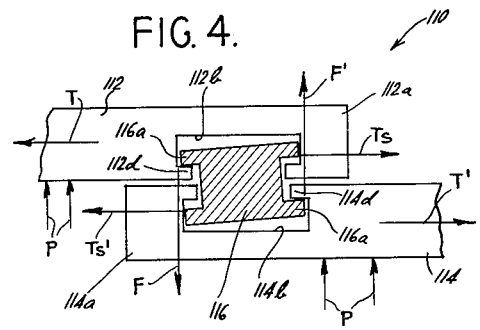
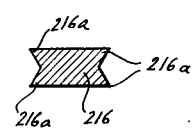
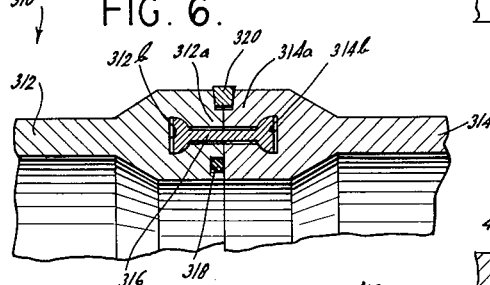
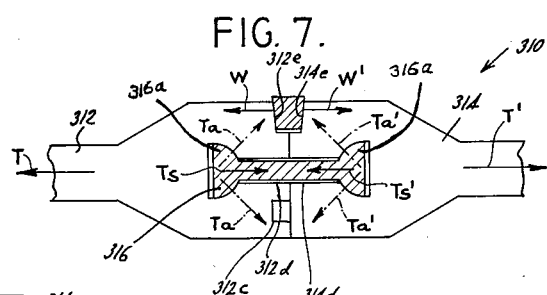
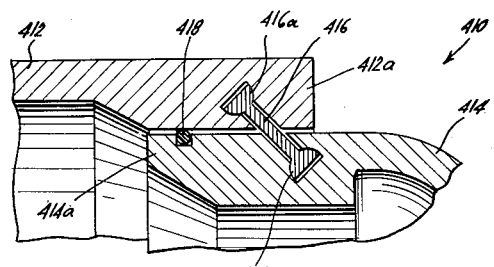
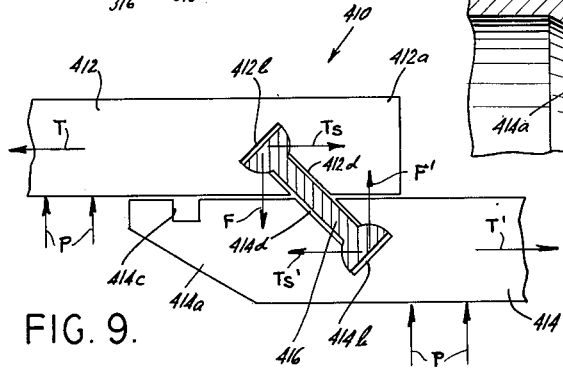
INVENTOR.
BENJAMIN J. ALECK
BY Amster + Levy
ATTORNEYS

*INVENTOR.*
BENJAMIN J. ALECK
BY Amster & Levy
ATTORNEYS

United States Patent Office 3,039,649
Patented June 19, 1962

3,039,649
FASTENER ASSEMBLY
Benjamin J. Aleck, Jackson Heights, N.Y., assignor to Arde-Portland, Inc., Paramus, N.J., a corporation of Maine
Filed July 29, 1959, Ser. No. 830,351
5 Claims. (Cl. 220—80)

The present invention relates generally to snap rings and related types of fasteners for various joints, and in particular to an improved pressure vessel and snap ring assembly.

Pressure vessels generally consist of a pair of mating vessel members having rims extending longitudinally thereof. These vessel members cooperate to contain material under pressure, their rims fitting together in sealing relationship to maintain a high pressure in the interior of the vessel. However, such pressures inside the vessel have a tendency to force the vessel members apart longitudinally and to expand the rims radially, and any relative motion of the vessel members in response to these pressures tends to break the seal between the rims and allow the pressure to drop. In order to prevent relative motion of the vessel members in one of these directions there is generally provided a snap ring which fits within aligned snap ring sockets which extend about the confronting surfaces of the rims of the vessel members. The snap ring engages the vessel members and extends between the contronting surfaces thereof in such manner as to resist such relative motion of the vessel members as involves their sliding across each other in a direction parallel to their confronting surfaces. In the past, however, snap rings have not been designed for preventing such relative motion of the vessel members as involves their spreading apart in a direction transverse to their confronting surfaces. In fact, certain types of snap rings have exerted forces on the cooperating rims of the vessel members in such a way as to force these rims apart, thus actually decreasing the effectiveness of the pressure vessel in containing material under pressure.

Accordingly it is broadly an object of the present invention to provide a snap ring type of fastener and a related assembly which solves one or more of the aforesaid problems. More particularly it is an object of the present invention to provide a pressure vessel and snap ring assembly in which the snap ring is effective to prevent relative motion of the vessel members in more than one direction. Thus, in addition to preventing the vessel members from sliding across one another, the snap ring should also interengage with the snap ring sockets of the vessel members so as to prevent the vessel members from pulling apart from each other.

In accordance with an illustrative embodiment demonstrating features of the present invention there is provided a pair of mating vessel members which cooperate to enclose material under pressure and which tend to move in first and second directions relative to each other in response to the pressure therein. The vessel members have rims which are sized to fit together and which are formed with aligned snap ring sockets on confronting surfaces thereof and projections disposed transversely to the second direction positioned outwardly of the snap ring sockets. A snap ring is mounted within the snap ring sockets extending between the rims to resist relative motion of the vessel members in the first direction. The snap ring is formed with flanges shaped to be received within the snap ring sockets inwardly of the projections and disposed transversely to the second direction to engage the projections to restrain relative motion of the vessel members in the second direction. Thus, advantageously, separation of the vessel members is restrained in an additional direction by positive interengaging means on the snap ring and snap ring sockets.

The foregoing brief description, as well as further features and advantages inherent in the present invention, may best be appreciated by reference to the following detailed description, when taken in conjunction with the accompanying drawings wherein:

FIG. 1 is a longitudinal cross-sectional view of a portion of a pressure vessel and shear-type snap ring assembly in accordance with the prior art;

FIG. 2 is an exaggerated schematic diagram illustrating the forces operating on the assembly of FIG. 1;

FIG. 3 is a longitudinal cross-sectional view of a portion of one embodiment of a pressure vessel and shear-type snap ring assembly in accordance with the present invention;

FIG. 4 is an exaggerated schematic diagram illustrating the forces operating on the assembly of FIG. 3;

FIG. 5 is a cross-sectional view of another embodiment of shear-type snap ring in accordance with the present invention;

FIG. 6 is a longitudinal cross-sectional view of a portion of a pressure vessel and tensile snap ring assembly in accordance with the present invention;

FIG. 7 is an exaggerated schematic diagram illustrating the forces operating on the assembly of FIG. 6;

FIG. 8 is a longitudinal cross-sectional view of a pressure vessel and canted tensile snap ring assembly in accordance with the present invention;

FIG. 9 is an exaggerated schematic diagram illustrating the forces operating on the assembly of FIG. 8;

Figure 10:
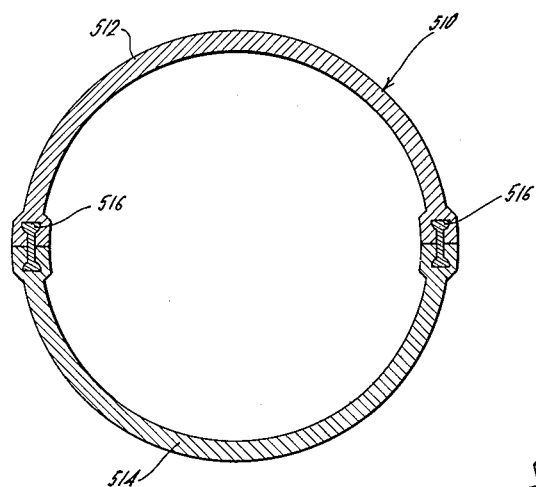
FIG. 10 is a transverse cross-sectional view of a shell consisting of two longitudinal half-shells fastened together by a pair of elongated tensile fasteners in accordance with this invention.

Referring now specifically to the drawings, FIG. 1 and 2 illustrate a pressure vessel and snap-ring assembly, designated generally by the numeral 10, in accordance with the prior art. This assembly includes a pair of mating vessel members 12 and 14 which cooperate to enclose material under pressure and a shear-type snap ring 16 which prevents relative motion of the vessel members. The vessel members 12 and 14 have rims 12a and 14a respectively which extend longitudinally of the vessel members (that is, horizontally in the drawings) and are adapted to fit together in radially overlapping sealing relationship (that is, vertically overlapping in the vertically sectioned views of the drawings). In response to the pressure inside the vessel, the vessel members 12 and 14 tend to be separated in the longitudinal direction. The rims 12a and 14a have aligned snap-ring sockets 12b and 14b at confronting locations thereon, and snap-ring 16 fits within the snap-ring sockets and extends between the pressure vessel members 12 and 14 so that its inherent resistance to the transverse shear forces exerted thereon by the longitudinal separation of the vessel members enables it to restrain such separation.

In FIG. 2 it is seen that the pressure inside the vessel members 12 and 14 exerts longitudinal forces T and T' and radial forces P upon the vessel members. The forces T and T' tend to separate the overlapping rims 12a and 14a longitudinally. The snap ring 16 exerts forces Ts and Ts' on the vessel members 12 and 14 which restrain this longitudinal separation, but, in attempting to separate, the overlapping rims 12a and 14a exert a couple on the snap-ring 16 which tends to twist the latter within the snap ring sockets 12b and 14b, as seen in the exaggerated schematic view of FIG. 2. As the snap ring 16 rotates in response to this couple, it exerts forces F and F' which tend to separate the confronting surfaces of the overlapping rims 12a and 14a in the radial direction. The greater the separation between the cooperating rims 12a and 14a, the greater difficulty is experienced by the vessel members 12 and 14 in containing the high pressure material therein.

In accordance with the present invention, however, there is seen in FIGS. 3 and 4 a snap ring and pressure vessel assembly, designated generally by the numeral 110, which has cooperating vessel members 112 and 114 formed with circular rims 112a and 114a adapted to fit together in overlapping relationship and tending to move longitudinally across each other in response to the pressure therein. A sealing member 118 rests in a cavity 114c formed in the rim 114 to provide a resilient seal between the confronting surfaces of the overlapping rims 112a and 114a. It will be appreciated that the effectiveness of the sealing member 118 in sealing off the space between the overlapping rims 112a and 114a is directly dependent upon the maintenance of a close proximity between the confronting surfaces thereof. The vessel members 112 and 114 have radially aligned snap ring sockets 112b and 114b at confronting locations on the overlapping rims 112a and 114a, and longitudinally disposed projections 112d and 114d positioned outwardly of the snap ring sockets. A snap ring 116 is formed with longitudinally disposed flanges 116a shaped to be received within the snap ring sockets 112b and 114b inwardly of the projections 112d and 114d, with the body of the snap ring 116 protruding through the constricted passages between the projections 112d and 114d and extending radially therebetween, exerting forces Ts and Ts' on the vessel members 112 and 114 to resist longitudinal relative motion thereof.

With this improved snap ring and pressure vessel assembly the pressure inside the vessel members 112 and 114 exerts forces P and forces T and T' thereon. The forces T and T' tend to separate vessel members 112 and 114 longitudinally and thus to slide the overlapping rims 112a and 114a thereof across each other. These forces T and T' are countered by the forces Ts and Ts', but the vessel members 112 and 114 still exert a couple on the snap ring 116 which tends to twist the latter within the snap ring sockets 112b and 114b. However, any tendency of the snap ring 116 to twist in response to this couple brings the longitudinally disposed flanges 116a thereof into interengagement with the longitudinally disposed projections 112d and 114d, causing the snap ring to exert forces F and F' which tend to force the overlapping rims 112a and 114a closer together in a radial direction. This increases the sealing effectiveness of the sealing member 118 by narrowing the intervening space through which the sealing member must prevent leakage.

While the flanges 116a and projections 112d and 114d are illustrated as rectangular in shape, it will be readily appreciated that similar interengagement may be achieved by any suitably shaped flanges and projections. Snap ring 216 in FIG. 5, for example, is formed with flanges 216a having a dovetail shape. In each case the snap ring sockets and projections would of course be shaped to mate with the particular shape of the snap ring flanges, so as to secure the advantageous effect whereby twisting of the snap ring is employed to increase rather than decrease the effectiveness of the seal between the vessel members by moving them closer together instead of further apart.

In accordance with a further embodiment of the present invention there is provided a tensile snap ring and pressure vessel assembly, designated generally by the numeral 310, in which vessel members 312 and 314 have rims 312a and 413a fitting together in longitudinally aligned relationship and formed with longitudinally aligned snap ring sockets 312b and 314b on the confronting surface thereof and radially disposed projections 312d and 314d positioned outwardly of the snap ring sockets. A tensile snap ring 316 is mounted within the snap ring sockets 312d and 314d and extends longitudinally therebetween. A sealing member 318 within a cavity 312c serves to seal the space between the confronting surfaces of the rims 312 and 314 provided the latter are not separated longitudinally. To prevent such longitudinal separation, snap ring 316 is formed with radially disposed flanges 316a fitting within the snap ring sockets inwardly of projections 312d and 314d and interengaging therewith. The flanges 316a are so shaped as to provide an enlarged head of semi-circular cross-section at either end of the snap ring 316, and the snap ring sockets 312b and 314b are shaped to provide corresponding internal seats of semi-circular cross-section which coincide with the aforesaid semi-circular heads so that the heads nest therein in the manner of a ball-and-socket joint. There is also provided a hoop 320 having a wedge-shaped across-section which is received within a correspondingly shaped hoop cavity 312e, 314e formed in the rims 312a and 314a. The wedged-shaped hoop 320 serves primarily to pre-load snap ring 316 by spreading the rims 312a and 314a longitudinally just enough to insure ball-and-socket engagement between the semi-circular snap ring heads and the semi-circular socket seats, so that the snap ring 316 remains under tension and consequently exerts a tensile force on the rims 312a and 314a at all times. The inherent hoop tension of the hoop 320 forces it radially inwardly into the cavity 312e, 314e until it contacts the sides of the cavity, and the tapered shapes of the hoop and cavity causes a wedging apart of the rims 312a and 314a which results in the aforesaid pre-loading of the snap ring 316.

In FIG. 7 the forces operating on the various components of the pressure vessel and snap ring assembly 310 are shown. The material inside the vessel exerts forces T and T' which tend to separate the vessel members 312 and 314 longitudinally. The hoop 320 exerts a wedging action illustrated by the forces W and W' which add to the tendency of the vessel members 312 and 314 to be separated longitudinally. However, the radially disposed interengaging flanges 316a and projections 312d and 314d exert the forces Ta and Ta', the resultants of which are the pure tensile forces Ts and Ts', which restrain longitudinal separation of the vessel members 312 and 314. In addition, the snap ring 316, because it is provided with the equivalent of a ball-and-socket connection at either end, can only be subjected to pure tensile forces regardless of whatever relative movements of the rims 312a and 314a might occur to vary the loads on the snap ring 316. If the rims 312a and 314a tended to move in a radial direction relative to each other, for example, this would only cause the snap ring 316 to shift slightly from its normal longitudinal alignment, the semi-circular heads rotating in the semi-circular sockets, so that the load on the snap ring 316, although remaining purely tensile, would be redirected so that a radial component thereof could resist radial separation of rims 312a and 314a while a longitudinal component would continue to resist the normal tendency toward longitudinal separation of the rims.

Advantageously, therefore, it is seen that a snap ring in accordance with this embodiment of the present invention also serves to restrain motion of the vessel members 312 and 314 relative to each other in two directions.

FIGS. 8 and 9 illustrate a still further embodiment of a pressure vessel and snap ring assembly in accordance with the present invention, wherein a canted tensile snap ring is employed in conjunction with overlapping rims. The assembly, designated generally by the numeral 410, includes vessel members 412 and 414 having longitudinally extending rims 412a and 414a fitting together in radially overlapping relationship. The latter are formed with diagonally aligned snap ring sockets 412b and 414b on confronting surfaces thereof, and projections 412d and 414d which are disposed transversely to the radial direction. A diagonally canted tensile snap ring 416 is received within the diagonally aligned snap ring sockets and is formed with interengaging flanges 416a disposed transversely to the radial direction. As in the case of the tensile snap ring assembly 310, the flanges 416a and sockets 412b and 414b are shaped to provide ball-and-socket type connections at either end of the snap ring 416, so that all loads thereon are purely tensile. A sealing member 418 is received with a cavity 414c and forms a seal between the confronting surfaces of the overlapping rims 412a and 414b the effectiveness of which requires the maintenance of close proximity between these confronting surfaces.

In the operation of this embodiment of the invention once again the pressure inside the vessel exerts forces P and forces T and T' on the vessel members 412 and 414. The tendency of forces T and T' to separate the vessel members longitudinally is counteracted by the forces Ts and Ts' exerted thereon by the snap ring 416, but the snap ring experiences a couple which tends to twist it within the snap ring sockets 412b and 414b. The latter effect, however, results in an interengagement between the flanges 416a and the projections 412d and 414d such that the snap ring 416 exerts on the vessel members 412 and 414 forces F and F' which tend to bring radially closer, narrowing the space therebetween and consequently increasing the effectiveness of the seal provided by the sealing member 418. The resultant of forces Ts and F at one end of the snap ring 416 and forces Ts' and F' at the other end is, as in the snap ring assembly 310, a purely tensile load. In the case of the canted snap ring 416, however, its canted orientation enables the snap ring to resist both radial and longitudinal movement of rims 412a and 414a by means of the respective radial and longitudinal components of the purely tensile load thereon.

It will therefore be appreciated that in each of the foregoing embodiments the present invention provides a snap ring which extends between and engages confronting surfaces of vessel members and prevents these vessel members from sliding or moving across each other. In addition, however, a snap ring in accordance with this invention interengages with correspondingly shaped snap ring sockets provided on the rims of the vessel members to exert a force on the vessel members which prevents them from being spread apart in response to the great pressures exerted on the vessel members by the materials contained therein.

Figure 11:
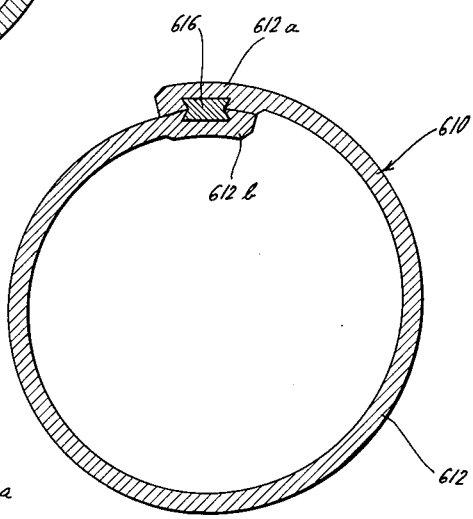
FIG. 11 is a cross sectional view of a shell having an overlapping joint fastened by an elongated shear-type fastener in accordance with this invention; and, FIG. 12 is a cross-sectional view of a shell having an aligned joint fastened by a single tensile fastener in accordance with this invention.
Figure 12:
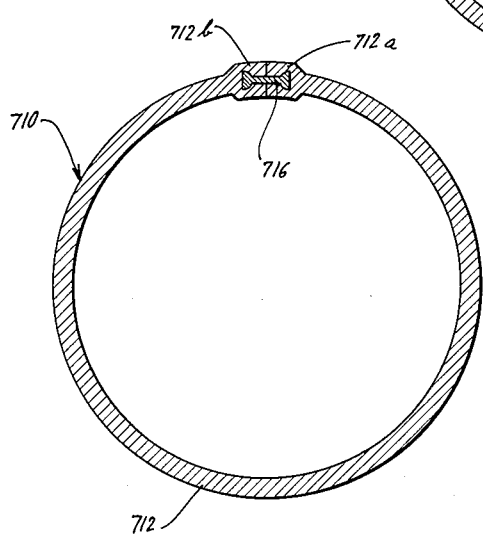

It will be further appreciated, moreover, that this invention has application to a wide variety of environments other than that of a snap ring and pressure vessel assembly, and indeed is useful wherever it is desired to fasten together two elements situated in confronting relationship to each other. Specifically, a shear-type fastening member having a flanged cross-sectional shape of the general type exemplified by snap rings 116 and 216 could be used to fasten together any two elements placed in overlapping relationship and formed with sockets on their confronting surfaces suitably shaped for interengagement with the fastening member, as with the rims 112a and 114a. Similarly, a tensile-type fastening member having a cross-sectional shape including semi-circular end heads of the general type exemplified by snap rings 316 and 416 could be used to fasten together any two elements placed together in aligned relationship and formed with confronting sockets having a cross-sectional shape including suitable semi-circular seats so as to provide a ball-and-socket type of connection, as with rims 312a and 314a; and could also be used to fasten together any two elements placed in overlapping relationship and formed with diagonally aligned confronting sockets of the aforesaid type, as with rims 412a and 414a. In FIG. 10, for example, there is seen an assembly 510 including a shell consisting of a pair of half-shells 512 and 514 meeting along two joints, each joint being fastened by one of a pair of fastening members 516 having the same cross-sectional shape as snap rings 316 and 416. Such a structure would be substantially identical, so far as the details of its operation are concerned, with the structure of FIGS. 6 and 7. FIG. 11 illustrates an assembly 610 including a one-piece shell 612 having a single joint formed by overlapping the side edges 612a and 612b of the shell, the joint being fastened by a fastening member 616 having the same cross-sectional shape as snap ring 216. The operational details of this embodiment of the invention are essentially the same as those of the structure of FIGS. 3 and 4. It will be readily appreciated that as an alternative the overlapping edges 612a and 612b could have been provided with diagonally aligned sockets similar in cross-section to the sockets 412b and 414b and a canted tensile fastening member inserted therein to perform the fastening function in essentially the manner illustrated in FIGS. 8 and 9. FIG. 12 illustrates a one-piece shell 712 having a single joint formed by the meeting of the side edges 712a and 712b thereof in aligned relationship fastened together by a tensile fastening member 716 having the same cross-sectional shape as snap rings 316 and 416, this structure operating in essentially the same manner as the structure of FIGS. 6 and 7.

When used in conjunction with pressure vessels or other types of members which it is desired to fasten together, a fastener in accordance with this invention may be easily mounted within the sockets provided therefor by inserting the fastener into open ends provided on the sockets of both the members to be fastened together while the latter are placed in confronting relationship. The fastener is then pushed longitudinally along the sockets until it is fully received therein. A single fastener extending substantially the length of the sockets may be used or resort may be had to a number of smaller fastener segments which are inserted successively to push preceding segments longitudinally through the sockets. In the special case of circular or rounded pressure vessels, a conventional snap ring port is provided at one point about the circumference thereof to provide open ends for the snap ring sockets through which a snap ring or a series of snap ring segments may be inserted tangentially in the well known manner.

The particulars of the foregoing description are provided merely for purposes of illustration and are subject to a considerable latitude of modification without departing from the novel teachings disclosed herein. Accordingly, the scope of this invention is intended to be limited only as defined in the appended claims, which should be accorded a breadth of interpretation consistent with this specification.

What I claim is:

1. The combination of a pair of parallel curved elements situated in radially offset overlapping relationship and having circumferentially elongated sockets on confronting surfaces thereof aligned radially and projections positioned outwardly of said sockets and disposed axially, a curved and circumferentially elongated shear-type fastening member inserted circumferentially through said sockets and extending radially between said elements in such manner as to be interposed to block axial relative motion thereof and to be twisted within said sockets in response to such motion and having axially projecting flanges shaped to be received within said sockets radially inwardly of said projections and positioned to engage said projections for restraining radial relative motion of said elements in response to said twisting of said fastening member when said fastening member is mounted within said sockets.

2. In combination, a pair of parallel curved elements situated in radial offset overlapping relationship and having circumferentially elongated sockets on confronting surfaces thereof aligned in a direction making an acute angle with said confronting surfaces and projections positioned outwardly of said sockets and disposed tranversely to the direction of alignment of said sockets and shaped to define seats of a circular arc cross-section, a tensile fastening member mounted within said sockets and having flanges received within said sockets inwardly of said projections shaped to define enlarged heads of a circular arc cross-section sized to nest against said seats, said flanges being disposed transversely to the direction of alignment of said sockets to engage said projections for placing said fastening member under a tensile load in response to separation of said elements in any direction whereby to restrain such separation.

3. The combination of a pair of parallel curved elements situated in radially offset overlapping relationship and having aligned circumferentially elongated sockets therein projections on said elements partially closing said sockets, a curved and circumferentially elongated fastening member inserted circumferentially through said sockets and extending between said elements in such a manner as to be interposed to block axial relative motion thereof and to be twisted within said sockets in response to such motion, said member having projecting flanges shaped to be received within said sockets inwardly of said projections and positioned to engage said projections for restraining radial relative motion of said elements in response to said twisting of said fastening member when said fastening member is mounted within said sockets.

4. The combination of claim 3, wherein said sockets are aligned radially and extend normal to said elements.

5. The combination of claim 3, wherein said sockets are aligned diagonally and extend at an acute angle relative to said elements.

References Cited in the file of this patent

UNITED STATES PATENTS

| | | |
|---|---|---|
| 840,826 | Colby | Jan. 8, 1907 |
| 1,446,274 | Roberts | Feb. 20, 1923 |
| 1,802,829 | Pierce | Apr. 28, 1931 |
| 2,645,513 | Sterrett | July 14, 1953 |
| 2,839,218 | Zerbe | June 17, 1958 |